United States Patent [19]

Tanaka et al.

[11] Patent Number: 4,958,293
[45] Date of Patent: Sep. 18, 1990

[54] DIGITIZING METHOD

[75] Inventors: Kunio Tanaka; Yasushi Onishi; Yoshihiro Itsubo, all of Tokyo, Japan

[73] Assignee: Fanuc Ltd., Minamitsuru, Japan

[21] Appl. No.: 269,744

[22] PCT Filed: Feb. 29, 1988

[86] PCT No.: PCT/JP88/00219

§ 371 Date: Oct. 27, 1988

§ 102(e) Date: Oct. 27, 1988

[87] PCT Pub. No.: WO88/06753

PCT Pub. Date: Sep. 7, 1988

[30] Foreign Application Priority Data

Mar. 3, 1987 [JP] Japan .................. 62-048312

[51] Int. Cl.$^5$ ........................................ G05B 19/00
[52] U.S. Cl. .................. 364/474.03; 364/474.2

[58] Field of Search .............. 364/167.01, 191–193, 364/474.03, 474.19, 474.20, 474.31, 474.35; 318/573

[56] References Cited

U.S. PATENT DOCUMENTS 4,550,383 10/1985 Sugimoto .................. 364/474.31
4,648,024 3/1987 Kato et al. .................. 364/513
4,841,430 6/1989 Nakagawa et al. .......... 364/474.31

Primary Examiner—Allen MacDonald
Attorney, Agent, or Firm—Staas & Halsey

[57] ABSTRACT

The invention relates to a digitizing method for moving a contactor along a model on the basis of tracer control and digitizing probe position data upon accepting the data. When three points most recently accepted are $P_1$, $P_2$ and $P_3$ in the order of acceptance, the point $P_2$ is not digitized if an angle $\theta$ defined by a vector $P_1P_2$ and a vector $P_2P_3$ is larger than a predetermined angle $\theta_{MAX}$.

9 Claims, 4 Drawing Sheets

DIGITIZING METHOD

BACKGROUND OF THE INVENTION

1. Field of the Invention

This invention relates to a digitizing method in which contactor position data is accepted while tracer control is being performed. More particularly, the method relates to a digitizing method in which it is possible to accept position data conforming to a profile even if there is bite-in at a corner portion or the like.

2. Description of the Related Art

A digitizer is available in which a contactor is moved along a model by tracer control, the present position of the contactor is monitored and the three-dimensional shape of the model is digitized by accepting contactor position data at a predetermined time interval.

If the contactor is a tracer head equipped with a stylus in this method of digitizing a three-dimensional shape by tracer control, the stylus is moved along the model without biting into the model. However, the motion of the tracer head holding the stylus is similar to the dotted line in FIG. 4, and the points indicated by the large dots are digitized as the path of the contactor ST. Consequently, when NC data is created using these digitized points and machining is performed in accordance with this NC data, a problem that arises is that bite-in occurs at the corner so that machining conforming to the shape of the model cannot be carried out.

Accordingly, an object of the invention is to provide a digitizing method that enables digitizing conforming to the shape of a model even if the contactor bites into the model at a corner or the like at the time of digitizing.

SUMMARY OF THE INVENTION

The invention relates to a digitizing method for moving a contactor along a model on the basis of tracer control and digitizing probe position data upon accepting the data as a predetermined reference. In this digitizing method, when three points most recently accepted are $P_1$, $P_2$ and $P_3$ in the order of acceptance, the point $P_2$ is not digitized if an angle $\theta$ defined by a vector $P_1P_2$ and a vector $P_2P_3$ is larger than a predetermined angle $\theta_{max}$.

BRIEF DESCRIPTION OF THE DRAWINGS

FIG. 4 is a view for describing bite-in; and

DESCRIPTION OF THE PREFERRED EMBODIMENT

Figure 1A:
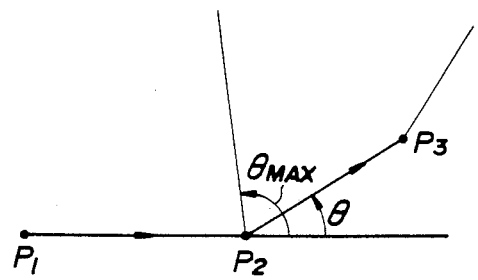
FIGS. 1(a) and 1(b) are views for describing the general features of the method of the present invention.
Figure 1B:
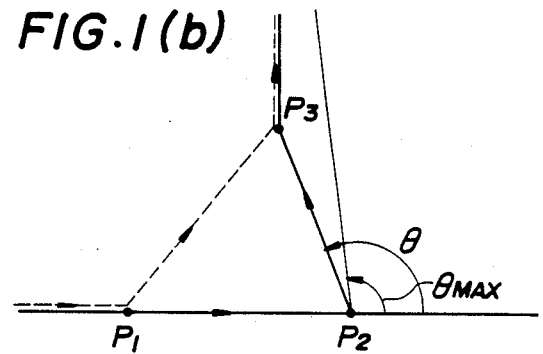
Figure 4:
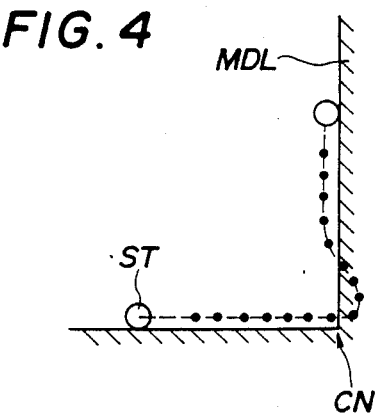

FIGS. 1(a) and 1(b) is a view for describing the general features of the method of the present invention.

$P_1$, $P_2$, $P_3$ represent three machine positions most recently accepted, $\theta$ denotes an angle defined by a vector $P_1P_2$ and a vector $P_2P_3$, and $\theta_{MAX}$ represents a maximum allowable angle.

Thus, let the three points most recently accepted be $P_1$, $P_2$ and $P_3$ in the order of acceptance. The angle $\theta$ defined by the vector $P_1P_2$ and the vector $P_2P_3$ is computed, the point $P_2$ [FIG. 1(b)] is not digitized when $\theta$ is greater than the predetermined angle $\theta_{MAX}$. When $\theta$ is less than the predetermined angle $\theta_{MAX}$, on the other hand, all three of the points $P_1$, $P_2$ and $P_3$ [FIG. 1(a)] are digitized.

Figure 2:
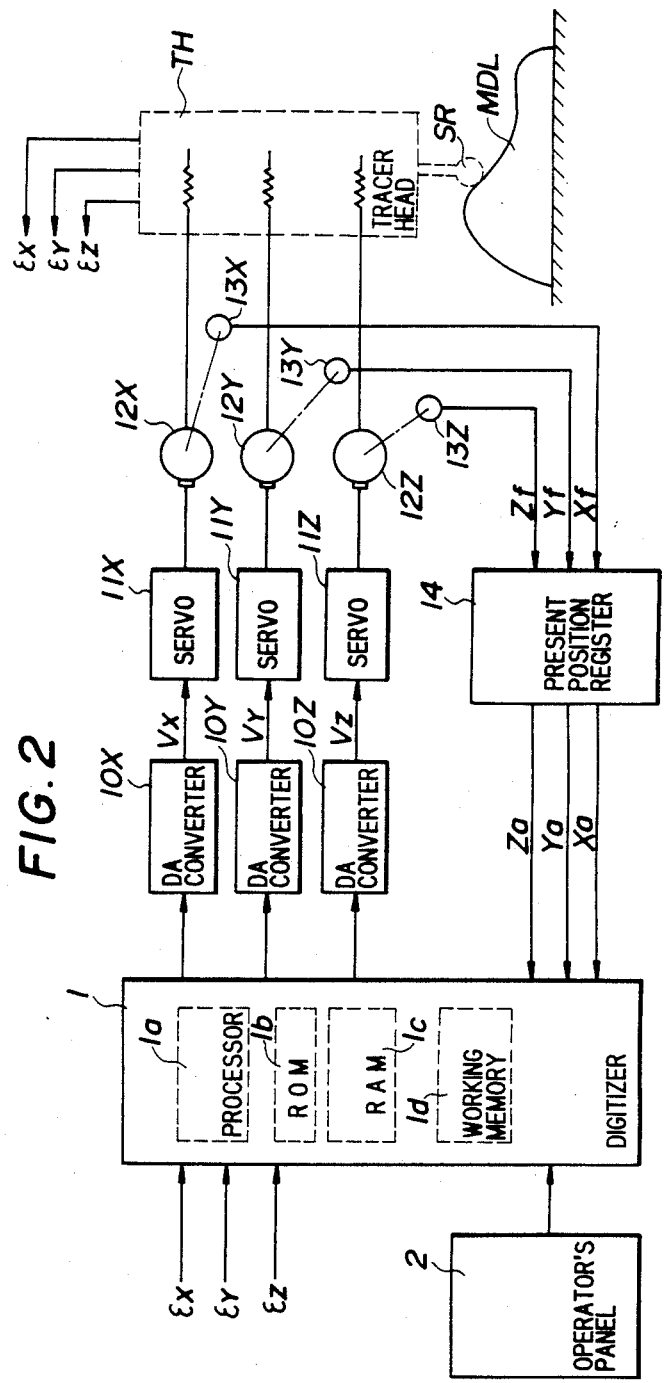
FIG. 2 is a block diagram of an apparatus (a digitizer) for executing digitizing processing according to the invention.

FIG. 2 is a block diagram of an apparatus (a digitizer) for executing digitizing processing according to the invention.

In FIG. 2, numeral 1 denotes a digitizer equipped with a digitizing function for accepting the present position of a tracer head while tracer control is being formed, as will be described below. The digitizer 1 has a processor 1a, a ROM 1b storing a control program, a RAM 1c for storing digitized data, and a working memory 1d.

Numeral 2 denotes an operator's panel having functions for inputting various operation signals and setting tracing conditions, tracing areas, tracing method and the like.

Numerals 10X, 10Y, 10Z denote DA converters for converting velocity data (digital values) along respective axes commanded by the digitizer 1 into respective analog velocity signals $V_x$, $V_y$, $V_z$. Numerals 11X, 11Y, 11Z denote X-, Y- and Z-axis servo circuits, respectively, 12X, 12Y, 12Z denote X-, Y- and Z-axis servomotors, respectively, 13X, 13Y, 13Z represent pulse generators for generating single pulses $X_f$, $Y_f$, $Z_f$, respectively, each time the corresponding motors rotate through a predetermined angle, and 14 denotes a present position register for reversibly counting the pulses $X_f$, $Y_f$, $Z_f$, in accordance with the direction of movement, to store the present positions along the respective axes. Further, TH represents a tracer head, SR a stylus, and MDL a model.

Figure 3:
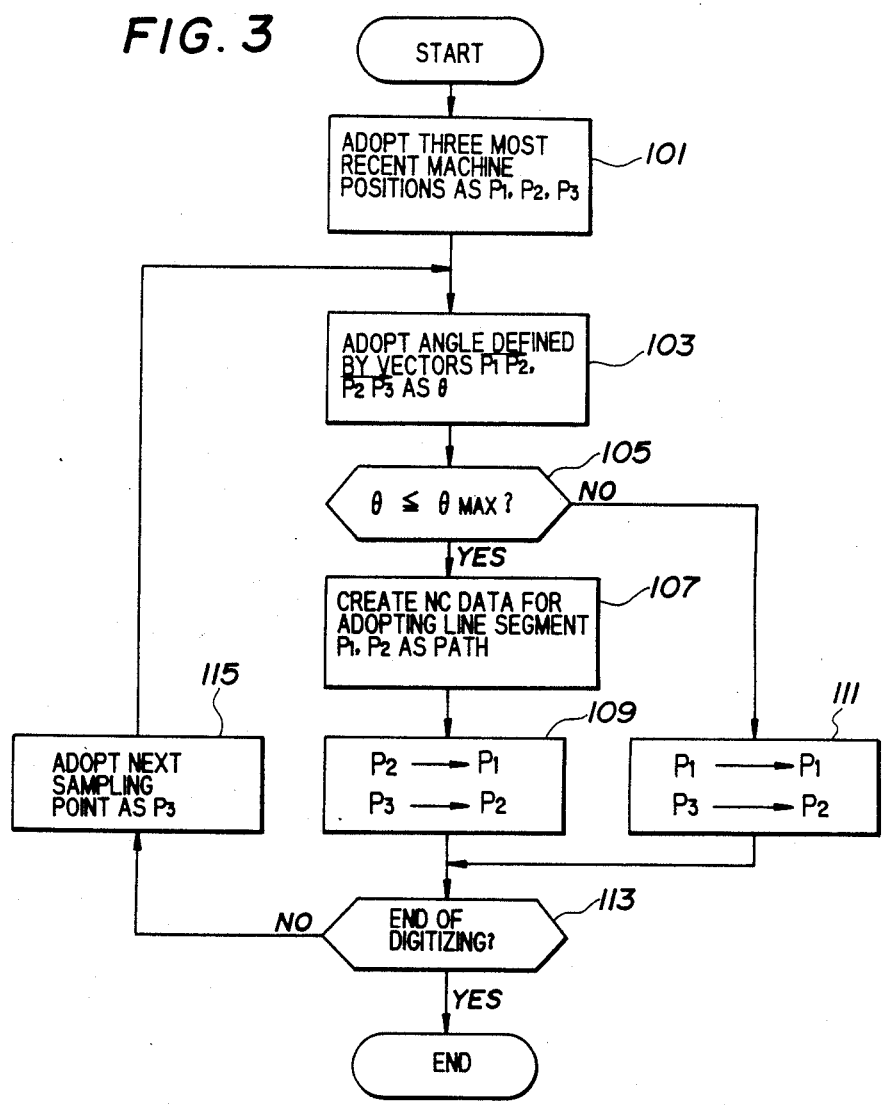
FIG. 3 is a flowchart of processing according to the invention.

FIG. 3 is a flowchart of processing according to the invention. The processing of the invention will now be described in accordance with FIGS. 1 through 3.

When the system is started by pressing a button on the operator's panel 2, the processor 1a of the digitizer 1 executes well-known tracer control processing using the tracing method, tracing conditions and tracing area data set in advance by the operator's panel 2, thereby generating velocity commands along the respective axes to control the movement of the tracer head TH in such a manner that the stylus SR moves along the model MDL. The tracing method is assumed to be surface tracing in the X-Z plane (where X is the feed axis and Z is the tracing axis).

When the tracer head moves, the pulse generators 13X, 13Y, 13Z generate the respective pulses $X_f$, $Y_f$, $Z_f$, which are applied to the present position register 14. Here the present position $X_a$, $Y_a$, $Z_a$ is updated by performing the following operations, which depend upon the direction of movement:

$$X_a \pm 1 \rightarrow X_a, \quad Y_a \pm 1 \rightarrow Y_a, \quad Z_a \pm 1 \rightarrow Z_a$$

Since the tracing method is assumed to be surface tracing in the X-Z plane, movement in the Y direction occurs only at the time of pick-feed.

In concurrence with tracar control, the processor 1a successively stores the present position $(X_a, Y_a, Z_a)$ of the tracer head, which is received from the present position register 14 every sampling time $\Delta T$, in the working memory 1d as the coordinates of the points $P_1$, $P_2$, $P_3$ (see FIG. 3) (step S101). It should be noted that a case in which the point data is stored in the RAM 1c or a case in which NC data is created based on the point data is referred to as digitizing.

Next, the angle $\theta$ defined by the vectors $P_1P_2$ and $P_2P_3$ is computed (step 103).

When the angle $\theta$ has been obtained, this angle is compared with a preset angle $\theta_{MAX}$ (step 105). If $\theta \leq \theta_{MAX}$ holds [FIG. 1(a)], the position data for point $P_2$ is stored in the RAM 1c or NC data making the line segment $P_1P_2$ a path is created and stored in the RAM (step 107).

Thereafter, the point $P_2$ is adopted as the point $P_1$, and the point $P_3$ is adopted as the point $P_2$ (step 109).

If $\theta > \theta_{MAX}$ is found to hold at the step 105 [see FIG. 1(b)], this is construed as indicating that bite-in has occurred. As a result, the bite-in point $P_2$ is discarded and point $P_3$ is adopted as point $P_2$. The point $P_1$ is kept as it is (step 111).

When the processing of step 109 or step 111 ends, whether or not digitizing processing has ended, or in other words, whether or not all tracing in a tracing area has ended, is checked (step 113). If it has not ended, the point to be sampled from the present position register 14 next is adopted as point $P_3$ (step 115). This is followed by repeating the processing from step 103 onward.

Figure 5:
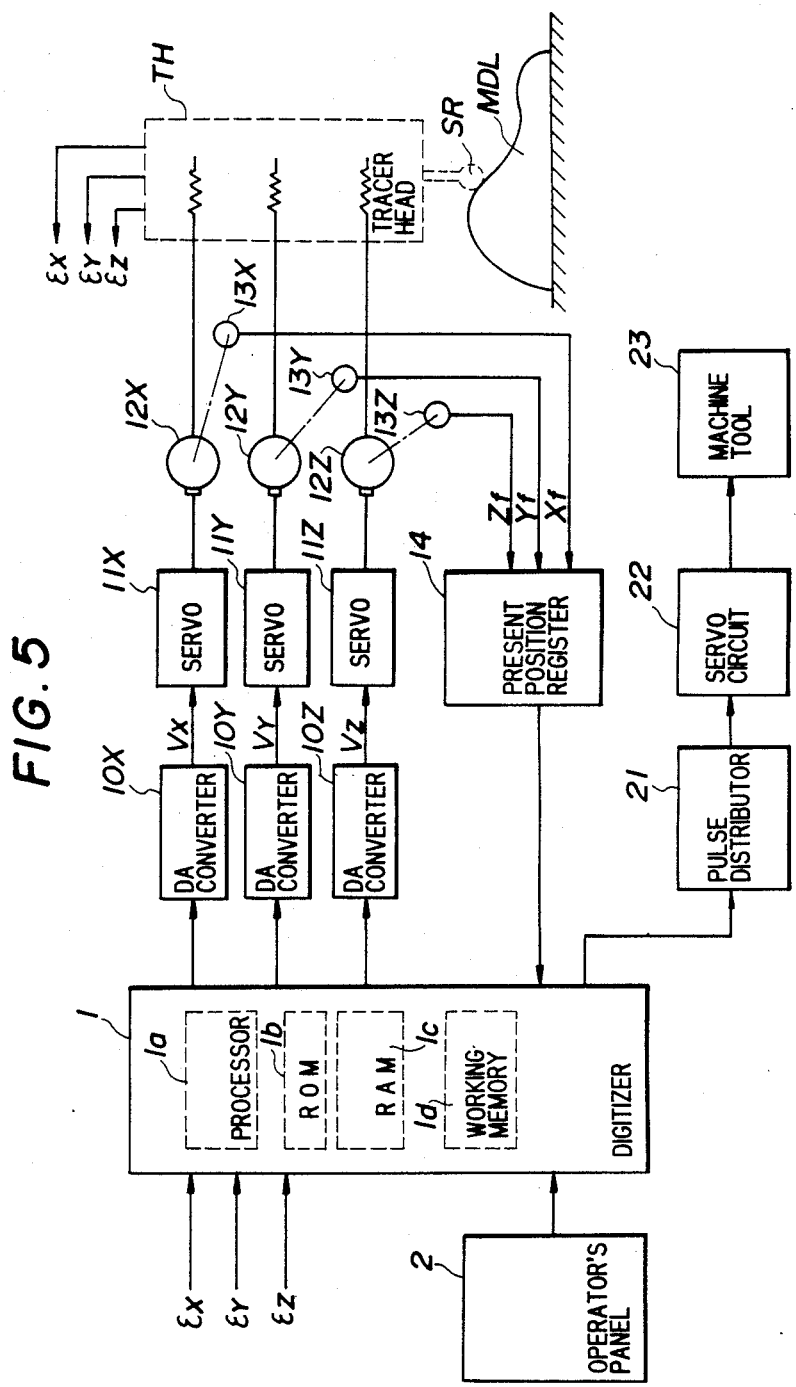
FIG. 5 is a block diagram illustrating a system for controlling a machine tool using digitized position data.

The foregoing relates to a case in which NC data is created using digitized position data. However, it is also possible to adopt an arrangement in which pulse distribution processing is performed in realtime using digitized position data, thereby moving the movable element of a machine tool to carry out machining conforming to the shape of a model. FIG. 5 is a block diagram of a system for such a case, in which portions the same as those in FIG. 2 are designated by like reference characters. FIG. 5 differs from FIG. 2 in that there are provided a pulse distributor 21 for each axis, a servo circuit 22 for each axis, and a machine tool 23. When the digitizer 1 digitizes position data (absolute data), an incremental value along each axis is obtained from the preceding digitized position, the incremental value is inputted to the pulse distributor 21, and the movable element (e.g., a tool) of the machine tool 23 is moved by performing well-known axis control, thereby carrying out machining conforming to the shape of the model.

In accordance with the invention as described above, the arrangement is such that when three points most recently accepted are $P_1$, $P_2$ and $P_3$ in the order of acceptance, the point $P_2$ is not digitized if an angle $\theta$ defined by a vector $P_1P_2$ and a vector $P_2P_3$ is larger than a predetermined angle $\theta_{MAX}$. Accordingly, even if the contactor bites into the model at a corner or the like, digitizing conforming to the shape of the model can be performed, and machining conforming to the shape of the model can be carried out in accordance with the digitized NC data or by realtime control using digitized position data.

It is described hereinabove that the points are accepted at a predetermined time interval However, an arrangement can be adopted in which points are accepted whenever a predetermined distance is travelled or whenever an error exceeds an allowable value.

What we claimed is:

1. A digitizing method for moving a contractor along a model on the basis of tracer control and digitizing probe position data upon accepting the probe position data as a predetermined reference, said method comprising the steps of:
   (a) computing an angle $\theta$ between a vector $P_1P_2$ and a vector $P_2P_3$, where $P_1$, $P_2$ and $P_3$ are first, second and third probe position data points consecutively received from the probe position data in the order of acceptance;
   (b) comparing the angle $\theta$ with a present angle $\theta_{max}$;
   (c) digitizing the second probe position data point $P_2$ unless said comparing in step (b) indicates the angle $\theta$ is larger than the angle $\theta_{max}$; and
   (d) machining a workpiece in accordance with the digitized probe position data.

2. A digitizing method as recited in claim 1, wherein the model has a shape, and
   wherein step (d) includes the step of moving a movable element of a machine tool using the digitized position data to perform machining conforming to the shape of the model.

3. A digitizing method as recited in claim 1, wherein said method further comprises the steps of:
   (e) replacing the second probe position data point with the third probe position data point; and
   (f) receiving a next probe position data point sequentially available from the probe station data as the third probe position data.

4. A digitizing method as recited in claim 3, wherein said method further comprises the steps of:
   (g) replacing the first probe position data point with the second probe position data point when said comparing in step (b) indicates the angle $\theta$ is less than or equal to the angle $\theta_{max}$.

5. A method for digitizing probe position data to eliminate bite-in, the probe position data is generated by moving a contractor over a model, said method comprising steps of:
   (a) successively receiving first, second and third probe position data points of the probe position data;
   (b) computing an angle between a first vector, formed from the first probe position data point to the second probe position data point, and a second vector, formed from the second probe position data point to the third probe position data point;
   (c) comparing the angle computed in step (b) with a predetermined maximum angle;
   (d) digitizing the second probe position data point if said comparing in step (c) indicates the angle is less than the predetermined maximum angle;
   (e) replacing the first probe position data point with the second probe position data point if said comparing in step (c) indicates the angle is less than the predetermined maximum angle;
   (f) replacing the second probe position data point with the third probe position data point;
   (g) receiving a next probe position data point sequentially available from the probe position data as the third probe position data;
   (h) repeating steps (b)-(g) using the first, second and third probe position data points produced by steps (e)-(g); and
   (i) machining a workpiece in accordance with the second probe position data points digitized in step (d).

6. A method as recited in claim 5, wherein bite-in is detected and said digitizing in step (d) is not performed when said comparing in step (c) indicates that the angle is greater than the predetermined maximum angle.

7. A method as recited in claim 5, wherein said receiving in step (a) receives the probe position data points at a predetermined interval.

8. A method as recited in claim 7, wherein the predetermined interval is an interval of time.

9. A method as recited in claim 7, wherein the predetermined interval is an interval of distance.

* * * * *